United States Patent [19]

Wurster et al.

[11] 3,997,483

[45] Dec. 14, 1976

[54] POLYAMIDEPOLYAMINE AND POLYANIONIC POLYMER PRETREATED NON-CELLULOSIC CARRIER ADSORPTION AGENTS

[75] Inventors: Rudolf Wurster, Pfeffingen; Jaroslav Haase, Basel, both of Switzerland

[73] Assignee: Ciba-Geigy Corporation, Ardsley, N.Y.

[22] Filed: Oct. 31, 1974

[21] Appl. No.: 519,881

[30] Foreign Application Priority Data

Nov. 8, 1973  Switzerland .................. 15718/73

[52] U.S. Cl. .................................. 260/15; 210/36; 260/9; 260/17.3; 260/17.4 R; 260/17.4 CL; 260/18 R; 260/849
[51] Int. Cl.² .................. C08L 1/28; C08L 91/00
[58] Field of Search ...... 260/15, 18 R, 849, 17.4 R, 260/17.4 CL, 9, 17.3; 210/24, 36, 28, 54

[56] References Cited

UNITED STATES PATENTS

| | | | |
|---|---|---|---|
| 2,040,818 | 5/1936 | Badollet | 210/506 |
| 2,387,714 | 10/1945 | Briggs | 210/36 |
| 2,613,813 | 10/1952 | Rodman et al. | 210/36 |
| 2,687,374 | 8/1954 | Mowry | 210/36 |
| 3,235,492 | 2/1966 | Andresen et al. | 210/36 |
| 3,352,424 | 11/1967 | Guebert et al. | 210/36 |

*Primary Examiner*—Edward M. Woodberry
*Attorney, Agent, or Firm*—Joseph G. Kolodny; Edward McC. Roberts; Prabodh I. Almaula

[57] ABSTRACT

An adsorption material for the purification of industrial effluents which comprises a non-cellulosic carrier pretreated with a polymer associate of a basic, nitrogenous polymer with a polyanionic polymer.

9 Claims, No Drawings

POLYAMIDEPOLYAMINE AND POLYANIONIC POLYMER PRETREATED NON-CELLULOSIC CARRIER ADSORPTION AGENTS

The present invention provides adsorption material for the purification of industrial effluents, in particular the decolorisation of waste water occurring in the textile, paper and leather industry and in the manufacture of fluorescent brighteners and dyes, for example residual liguors, rinsing and wash waters. The adsorption material according to the invention contains a non-cellulosic carrier which has been treated with a polymer associate of a basic nitrogenous polymer with a polyanionic polymer.

One of the greatest environmental problem in industrialised areas is the pollution of rivers and lakes. Because the pollution originates from the industrial areas, the purification of industrial effluents is gaining increasing importance at the present time. However, this effluent purification is proving to be exceedingly difficult, especially whenever it is a matter of eliminating organic substances dissolved in water that are biologically non-decomposable. Within this nexus of problems there is consequently an urgent need for the decolorisation and purification of effluents that occur in the dyestuff, textile, paper and leather industry.

Different processes have already been proposed for the purifivation of highly coloured and polluted effluents that occur e.g. in the manufacture and use of dyes and dyeing assistants. It is known, for example, to collect coloured effluent or wash waters in large tanks and to precipitate the dyestuff and assistant residues by addition of suitable flocculants and to separate them by sedimentation, flotation or filtration. However, this process has the disadvantage that the quantities of water to be treated are large and the sedimentation or the separation of the flocks from the purified water involves the use of complicated apparatus.

It is also known to use activated charcoal for purifying, especially for decolorising, industrial effluents. The use of activated charcoal by itself normally proves to be not very suitable, since the capacity of the activated charcoal for adsorbing organic dyes dissolved in water and impurities present in effluent is too small.

The surprising discovery has now been macde that a rapid and ample purification of industrial effluents is obtained by bringing these into contact with the adsorption agent according to the invention which, compared with activated charcoal, is characterised by an increased capacity for adsorbing substances that are dissolved or dispersed in water.

The novel adsorption agent is suitable, above all, for eliminating anionic substances, especially for removing residues of anionic dyes, fluorescent brighteners, dyeing assistants, tannins, detergents or mixtures thereof.

With the aid of the novel adsorption material it is possible to remove to a large extent the previously mentioned substances not only from incompletely exhausted dye, brightener and treatment liquors, but also to purify to a satisfactory extent the corresponding residual liquors that contain nonionogenic assistants as well as liquors which are diluted by rinsing waste waters and normally contain mixtures of dyes and detergents.

On account of the broad applicability of the novel adsorption material, it is possible to meet the nowadays ever more urgent demand for saving fresh water by a partial to complete recirculation or residual or waste liquors. Independently of the apparatus, these are principally the effluents of the dyestuff, textile, paper and leather industry that occur in connection with dyeing, washing and tanning processes. In the case of a dyeworks, these effluents can originate from the conventional dyeing aparatus used for the dyeing of loose fibrous material, tops, yarn, and woven and knitted fabrics, and also from cleaning machines, e.g. an openwidth washer.

The effluents to be purified are brought preferably in undiluted form into contact with the adsorption material according to the invention, optionally after a pH adjustment, e.g. from 2 to 7, especially 3 to 5 or 3 to 4. There are principally three processes which are suitable for this purpose:

a. the stirring process, in which the water subject to purification is stirred in a vessel with the adsorption agent and then the two are separated;

b. the fluid bed process, in which the adsorption agent is kept in suspension through the flow of the liquor to be purified;

c. the filtration process, in which the liquor subject to purification is conducted through a filter-like adsorption material.

If the last of these three process modifications, the filtration process c), is applied, then the following three modifications with respect to the apparatus employed are chiefly suitable:

1. The treatment apparatus, e.g. dyeing appliance, is firmly connected to the filter device.
2. The filter device is movable and can be coupled as required with any treatment apparatus.
3. The effluents originating from the treatment apparatus are combined in a suitable container and then jointly filtered.

The purification is desirably carried out at 10° C to 150° C. Preferably, however, it is effected between 30° C and 130° C and especially between 30° C and 100° C, and the purification of the effluents can also be carried out optionally under pressure.

Suitable carrier materials for the manufacture of the adsorption agent are e.g. inorganic fillers, non-ionogenic synthetic plastics or mixtures of such carriers.

It is possible to use as carrier materials synthetic plastics that are devoid of groups which form ionogenic salts in water, i.e. which contain neither groups that exhibit acid dissociation in water, e.g. sulphonic acid, carboxylic acid or phosphonic acid groups, nor onium groups, e.g. ammonium, sulphonium or phosphonium groups.

Such non-ionogenic plastics can belong to the most varied known classed of regenerated and man-made synthetic fibres. These include polycondensates, polymers and polyadducts which can be both duroplasts and thermoplastics. Examples of suitable regenerated man-made plastics are cellulose esters, e.g. cellulose nitrate, cellulose acetate, cellulose triacetate, cellulose acetobutyrate, cellulose propionate, cellulose ethers, e.g. methyl cellulose, ethyl cellulose and benzyl cellulose. Advantageously, man-made polymers in fibre or granule form are used. As examples there may be cited: linear polyesters or polyolefin fibres and polystyrene or polyurethane foam granules.

Also suitable are water-insoluble condensation polymers, e.g. of urea or melamine and formaldehyde. Preferably, these plastics are in a form having a large specific surface area, e.g. in the form of finely structured agglomerates of almost sphercal particles.

Suitable inorganic fillers for the manufacture of the adsorption material are, above all, white fillers, e.g. titanium dioxide, silicon dioxide (quartz, diatomaceous earth, kieselguhr), zinc oxide, aluminium hydroxides, barium sulphate or carbonate, calcium carbonate or sulphate, magnesium carbonate, dolomite, aluminium silicates or hydrosilicates, mica, powdered slate, calcium silicates, magnesium silicates (talcum, asbestos powder), clay and kaolin types like terra alba, porcelain clay, China clay, bolus alba, also silica, silica gel, silicic acid and fuller's earth.

If desired, the adsorption material can contain in addition cellulosic material as carrier in an amount of at most 50 percent by weight, based on the weight of the entire carrier material. The cellulosic material can be e.g. in the form of granules or paper pulp. Preferably there is used in this case cellulosic material that has been pretreated with precipitating agents. As precipitating agents it is possible to use the basic nitrogenous polymers and the polymer associates derived therefrom which are possible for the non-cellulosic carrier, optionally combined with the following metal salts or hydrated metal oxides.

The polymer associates used for the manufacture of the adsorption materials are bonded by adsorption by the carrier material and exert simultaneously a precipitating or retardant action on the residual substances in question, e.g. dyes, fluorescent brighteners, detergents or tannins. Suitable basic polymers for the manufacture of these associates are principally polymers which possess basic nitrogen atoms capable of salt formation. Examples of such polymers are basic aminoplasts which are soluble or dispersible in water, e.g. formaldehyde-dicyandiamide condensation producs. Desirably, condensation products of formaldehyde, dicyandiamide and urea or of an alkylenepolyamine with altogether 2 to 18, preferably 2 to 8, carbon atoms and 2 to 5 amino groups are used.

The alkylenepolyamines are, for example, ethylene diamine, propylene diamine, butylene diamine, pentylene diamine, hexamethylene diamine, diethylene triamine, triethylene triamine, 1,2-propylene diamine, dipropylene triamine, tripropylene tetramine, dihydroxydipropylene triamine, dibutylene triamine, tributylene triamine, tetrabutylene pentamine, dipentylene triamine, tripentylene tetramine, tetrapentylene pentamine, dihexamethylene triamine, trihexamethylene tetramine and tetrahexamethylene pentamine. It is also possible to use reaction products of epichlorohydrin or alkanedihalides with alkylene- or polyalkylenamines or alkylene- or polyalkyleneimines, e.g. reaction products of epichlorohydrin with diethylene triamine or triethylene tetramine or ethylene imine or polyethyleneimine.

Suitable basic aminoplasts are, above all, formaldehyde-dicyandiamide-ethylene diamine or formaldehyde-urea-dicyandiamide condensation products. Preferred products are obtained e.g. by condensation of 2 moles of formaldehyde with 1 mole of the reaction product of 2 moles of dicyandiamide with 1 mole of ethylenediamine or the corresponding salt, e.g. hydrochloride or ammonium chloride. Further basic aminoplasts are manufactured by condensation of 1 mole of urea, dicyandiamide and formaldehyde respectively in the presence of acid, e.g. hydrochloric acid, or by condensation of 3 to 4 moles of dicyandiamide with 7 moles of formaldehyde and 1 mole of the tetrahydrochloride of triethylene tetramine. Other products can be obtained by condensation of 1 mole of dicyandiamide with 2 to 2.2 moles of formaldehyde, 0.6 to 1 mole of ammonium chloride and 0.05 to 0.5 mole of ethylenediamine.

Basic polymers with a particularly interesting utility, however, are the polyamidepolyamines, which are obtained by reaction of polymerised, preferably dimerised to trimerised fatty acids with polyamines, expediently in such a ratio that the resultant polyamide resin has an amino value in the range of about 200 to 650 mg of potassium hydroxide per gram of polyamidepolyamine. As polyamines which can be used for the manufacture of the polyamidepolyamines it is possible to use aromatic polyamines or especially aliphatic polyamines which can also contain heterocyclic structures, e.g. imidazolines. Polymer fatty acids which are advantageously present in such polyamides are obtained by polymerisation of one or more unsaturated long-chain aliphatic or aromatic-aliphatic acids or esters thereof or other derivatives that can be readily converted into the acid. Suitable examples of such polymeric fatty acids are described in British Pat. Nos. 879,985 and 841,554. These polyamidepolyamines can be used by themselves or also in combination with the dicyandiamide condensation products previously mentioned.

The polymeric unsaturated fatty acids used herein are advantageously aliphatic, ethylenically unsaturated dimeric to trimeric fatty acids. Preferably, the polyamidepolyamines are manufactured from polyalkylenepolyamines and aliphatic, ethylenically unsaturated dimeric to trimeric acids which are derived from monocarboxylic acids with 16 to 22 carbon atoms. These monocarboxylic acids are fatty acids with at least one ethylenically unsaturated bond and preferably 2 to 5 such bonds. Representatives of this class of acids are e.g. oleic acids, hiragonic acid, eleostearic acid, licanoic acid, arachidonic acid, clupadonic acid and especially linoleic and linolenic acid. These fatty acids can be obtained from natural oils in which they occur principally as glycerides.

The dimeric to trimeric fatty acids are obtained in known manner by dimerisation of monocarboxylic acids of the indicated type. The so-called dimeric fatty acids always have a content of trimeric acids and a small content of monomeric acids.

The dimerised to trimerised linoleic or linolenic acids are particularly suitable. The commercial products of these acids contain as a rule 75 to 95 percent by weight of dimeric acids, 4 to 22 percent by weight of trimeric acids and 1 to 3 percent by weight of monomeric acid. The molar ratio of dimeric to trimeric acid is accordingly about 5:1 to 36:1.

Polymeric fatty acids or esters which are used for the manufacture of the reactive polyamides can also be epoxidised, for example by reaction with peracetic acid, performic acid or with hydrogen peroxide and formic acid or acetic acid. Suitable epoxidised fatty acids and esters are described in British Pat. Nos. 810,348 and 811,797.

Useful polyamides according to the invention can also be condensation products of polymeric fatty acids with polyamines as described in British Pat. Nos. 726,570 and 847,028. These products can be reacted with epoxide resins that are formed by reaction of polyvalent phenols with polyfunctional halohydrins and/or glycerol dichlorohydrin and are described in U.S. Pat. Nos. 2,585,115 and 2,589,245.

It is also possible to use in the present invention polyamide forms obtained by condensation polymerisation at elevated temperatures from a reaction mixture that contains polymeric fatty acids (manufactured according to British Pat. Nos. 878,985 and 841,544), monomeric fatty acids and lower polyalkylenepolyamines.

Suitable polyamide resins which can be used for the manufacture of the adsorption materials are described, for example, in British Pat. Nos. 726,570, 810,348, 811,797, 847,028, 865,656 and 1,108,558.

Further basic polymers are the polymers of an alkyleneimine with advantageously 2 to 4 carbon atoms and having an average molecular weight of 500 to 100,000, desirably 500 to 80,000 and especially 10,000 to 40,000. These polymers normally have a Brookfield viscosity at 20° C of 500 to 20,000 centipoise. Suitable alkyleneimins are in particular ethyleneimine, propyleneimine, 1,2-butyleneimine and 2,3-butyleneimine. Of all alkyleneimines, ethyleneimine is used for preference.

Optionally substituted homopolymers or copolymers of aliphatic, $\alpha,\beta$-ethylenically unsaturated carboxylic acids, advantageously in the form of their alkali metal salts, especially the sodium and potassium salts, or in the form of their ammonium salts, optionally in admixture with corresponding free polycarboxylic acids, have proved above all to be suitable polyanionic polymeric precipitating agents.

Preferably, there are used water-soluble homopolymers of acrylic acid which are optionally substituted by alkyl or halogen, for example homopolymers of the following monomers: acrylic acid, methacrylic acid, $\alpha$-ethylacrylic acid, $\alpha$-isopropylacrylic acid, $\alpha$-butylacrylic acid and $\alpha$-chloroacrylic acid and $\alpha$-chloroacrylic acid. Water-soluble homopolymers of acrylic or methacrylic acid with an average molecular weight of 20,000 to 1000,000, in particular those with an average molecular weight of 50,000 to 150,000, are particularly preferred.

Suitable copolymeric aliphatic, $\alpha,\beta$-ethylenically unsaturated carboxylic acids are above all copolymerisation products of acrylic acid and methacrylic acid, but also copolymerisation products of acrylic acid or methacrylic acid with a further substituted acrylic acid cited hereinbefore.

Further polyanionic copolymerisation products are obtained by copolymerisation of acrylic or methacrylic acid with further water-soluble or water-insoluble, copolymerisable comonomers that contain vinyl groups.

Examples of water-soluble comonomers are:
a. comonomers that contain sulphonic acid groups, e.g. styrenesulphonic acid;
b. comonomers that contain carboxylic acid groups, e.g. crotonic acid;
c. comonomers that contain carboxylic acid amide groups and N-hydroxyalkyl derivatives thereof, e.g. acrylic amide, methacrylic amide, N-hydroxymethylacrylic amide, N-$\beta$-hydroxyethylacrylic amide, N-$\gamma$-hydroxypropylacrylic amide, N,N-bis-$\beta$-hydroxyethylacrylic amide, N-hydroxymethylmethacrylic amide, N-$\beta$-hydroxyethylmethacrylic amide, N-$\gamma$-hydroxypropylmethacrylic amide and N,N-bis-$\beta$-hydroxyethylmethacrylic amide;
d. water-soluble, especially sulphonated derivatives of $\beta$-hydroxyalkylacrylic or -methacrylic amides which are obtained, for example, by condensation of acrylic or methacrylic acid halides, especially chlorides, with reaction products of alkanolamines and chlorosulphonic acid;
e. copolymerisable aldehydes, e.g. acrolein or croton aldehyde.

Examples of suitable water-insoluble comonomers are:
i. acrylic or methacrylic alkyl esters with 1 to 12 carbon atoms in the alkyl moiety which can optionally be still further substituted, in particular by hydroxy groups, e.g. the methyl ester, ethyl ester, $\beta$-hydroxyethyl ester, n-butyl ester and dodecyl ester of acrylic or methacrylic acid;
ii. vinyl esters of aliphatic carboxylic acids with 1 to 12 carbon atoms or mixtures of such carboxylic acids, e.g. vinyl acetate, vinyl formiate, vinyl butyrate, or vinyl esters of a carboxylic acid mixture with 9 to 11 carbon atoms;
iii. vinyl benzenes, e.g. styrene, chlorostyrene or methylstyrene.

As polyanionic copolymerisation products it is also possible to use copolymers of dibasic carboxylic acids and functional derivatives thereof, e.g. maleic acid, maleic anhydride, maleic acid monoalkyl esters and amides, fumaric acid, itaconic acid, citraconic acid, with aliphatic or araliphatic olefins.

The manufacture of the cited polyanionic polymers can be carried out in known manner in aqueous solution or suspension with the action of catalysts, preferably radical-forming catalysts, e.g. hydrogen peroxide, ammonium persulphate, potassium persulphate or organic peroxide, e.g. dibenzoyl peroxide, or with the use of ammonium persulphate and sodium hydrogen sulphite, and advantageously at a temperature between 40° C and 100° C.

Carboxyalkylated cellulose derivatives can be used as further polyanionic precipitating agents. Carboxymethyl cellulose, which is normally used in the form of its water-soluble alkali metal salts, e.g. the sodium or potassium salts, is particularly suitable. Such carboxymethyl cellulose derivatives desirably have a degree of substitution (DS) of 0.4 to 2; carboxymethyl salts with a DS of 0.7 to 1.2 are preferred. (Definition of the degree of substitution DS according to Encyc. of Polym. Sci. and Technol., vol. 3, pg. 468).

The precipitation of the basic polymers with the polyanionic polymers can be carried out with or without the carrier material. This polymer precipitation is preferably effected by precipitating the polymeric polycationic precipitating agents mentioned hereinbefore in aqueous medium with a polyanionic polymer. Sparingly soluble polymer associates which are precipitated on the carrier material are formed in this way. If the polymer precipitation is effected without a carrier material, the resultant polymer associates are subsequently applied to the carrier material in suitable form.

The amount of polyanionic precipitating agent used varies with advantage between 10 to 200% by weight, based on the polycationic polymer. Preferably 20 to 100% by weight of polyanionic agent is used.

To manufacture particularly efficient absorption material with high retention it has proved advantageous to use a combination of the polymer associates cited hereinbefore as precipitating agents with salts of polyvalent metals, e.g. aluminium sulphate, aluminium chloride, iron sulphate, iron chloride, magnesium sulphate, magnesium chloride and calcium chloride.

Such combinations have proved particularly advantageous for the purification of effluents that contain anionic dyes, fluorescent brighteners or tannins. In particular, effluents that contain mixtures of anionic and cationic dyes or mixtures of anionic and/or cationic dyes with anionic, cationic, non-ionogenic assistants and/or organic or inorganic salts, are successfully purified.

Preferably, the metal salts are used in hydrated form of the corresponding neutral or basic oxides. This is expediently accomplished by addition of inorganic or organic bases to the aqueous solution of the forementioned metal salts. As inorganic bases there are preferably used alkali metal hydroxides, e.g. sodium hydroxide, potassium hydroxide and aqueous ammonia, and as organic bases there are used principally alkylamines, e.g. methylamine, di- or trimethylamine, ethylamine, diethylamine or triethylamine and alkanolamines, e.g. monoethanolamine, diethanolamine or triethanolamine.

The amount of metal salts used varies with advantage betwee 5 to 300 percent by weight, and especially 10 to 300 percent by weight based on the amount of the polymer associates used. Preferably, 10 to 200 percent by weight and, above all, 50 to 200 percent by weight and above all, 50 to 200 percent by weight of the metal salt is used, based on the amount of the polymer associates.

The pretreatment of the carrier material with the polymer associates is effected advantageously in aqueous suspension, for example at room temperature (18°–25° C). However, it can also take place at elevated temperature up to 100° C. The amount of precipitating agents used varies with advantage between 0.5 and 70 percent by weight, based on the carrier material. Preferably, 10 to 50 percent by weight is used.

The duration of the pretreatment can be from a few minutes to several hours, depending on the chosen temperature conditions. The pretreated carrier can then be processed to filter materials, advantageously by known methods.

Preferably, the adsorption material according to the invention is suitable for removing water-soluble or water-dispersible and especially anionic dyes or fluorescent brighteners.

The anionic dyes that are removed according to the invention are dyes whose anionic character is dependent on metal complex formation alone and/or on the acid substituents that effect the water-solubility. Suitable acid substituents that effect the water-solubility are carboxylic acid groups, phosphoric acid groups, acylated sulphonic acid imide groups, e.g. alkyl- or aryldisulphimide groups of alkyl- or arylcarbonylsulphimide groups and above all sulphonic acid groups.

The anionic dyes can belong to the most widely varying classes of dye. As examples there may be mentioned oxazine, triphenylmethane, xanthene, nitro, acridone, stilbene, perinone, naphthoquinoneimine, phthalocyanine, anthraquinone and azo dyes. These last mentiond dyes can be metal-free, metallisable or metallisferous monoazo, disazo and polyazo dyes, including formazane dyes, in which the metal atom forms a 1:1 or 1:2 complex, especially 1:2 chromium or 1:2 cobalt complexes which contain two similar or two different molecules of azo dye bonded as complex to a chromium or a cobalt atom. These dyes also contain the molecule so-called reactive groups which form a covalent bond with the fibrous material to be dyed.

The absorption material according to the invention is suitable not only for decolorising residual liquors occuring in the textile, paper and leather industry, but furthermore is also most useful when it is a matter of eliminating residues of fluorescent brighteners from wash and bleach liquors. Particularly satisfactory results are obtained in the elimination of fluorescent brighteners of anionic character.

The fluorescent birghteners can belong to any class of brightener. The anionic brighteners are in particular stilbene compounds, cumarins, benzocumarins, pyrazines, pyrazolines, oxazines, dibenzoxazolyl or dibenzimidazolyl compounds or naphthalic imides which contain in the molecule at least one acid group, e.g. a carboxylic acid or preferably a sulphonic acid group, and can be fibre reactive.

A further advantage of the adsorption material according to the invention is that, besides the dyes, it permits also a partial elimination of anionic surfactants and dyeing assistants from aqueous waste liquors. Such assistants are described in more detail in "Tenside-Textilhilfsmittel-Waschrohstoffe" by Dr. Kurt Lidner (published by Wissenschaftlicher Verlagsgesellschaft Stuttgart, 1964). Compounds with a particularly interesting utility are those of the alkylarylsulphonic acid type. The retardant effect of anionic compounds of the alkylarylsulphonic acid type with 10 to 14 carbon atoms in the alkyl moiety is particularly pronounced.

The adsorption agent can also be effective in the elimination of anionic synthetic tannins, especially tannins that carry one or more sulpho groups in the molecule. A more detailed description of these compounds can be found e.g. in "Ullmans Encyclopedie der technischen Chemie", Vol. 11, pp. 595–598.

By appropriate choice of the adsorption material it is possible to extract up to 100% of the impurities from the effluents. Retardant effects of up to 20 g or even up to 50 g of waste matter, i.e. dye, fluorescent brightener, assistant, detergent, tannin, per 100 g of adsorption material can be achieved. Whenever a complete decolorisation or removal of the waste substances cannot be accomplished by a single treatment of the waste liquor with the adsorption material, it is advisable to repeat the cleansing procedure. The adsorption material can also be reduced to a minimum by means of the same step (recirculation).

The following Manufacturing Instructions and Examples described the invention in more detail, the percentages being in each case by weight.

Manufacturing Instructions

A. A suspension of 50 g of fuller's earth in 600 ml of water is treated at room temperature with 5 g of a polyamidepolyamine from polymerised linoleic acid/linolenic acid and triethylenetetramine (with an amino value of 350 to 400 mg of potassium hydroxide per gram of polyamidepolyamine) and the mixture is stirred for 2 hours.

A solution of 1.67 g of polymethacryl acid (average molecular weight 80,000 to 100,000) in 200 ml of water which has been adjusted to a pH of 6 with 10 ml of normal sodium hydroxide solution is added dropwise over the course of 30 minutes. The resultant suspension is further stirred for 1 hour and then treated with 33 ml of 10% aqueous aluminium chloride solution. The pH of the suspension is subsequently adjusted to 9.5 with aqueous ammonia.

B. A suspension of 10 g of polyester fibres (polyethylene glycol terephthalate, 3 denier, 3 mm staple length) in 2000 ml of water is treated at room temperature with 1 g of a polyamidepolyamine as described in Instruction A (amino value 350 to 400 mg of potassium hydroxide per gram of polyamide-polyamine) and then stirred for 2 hours. A solution of 0.33 g of polymethacrylic acid (average molecular weight 80,000 to 100,000) in 40 ml of water which has been adjusted to a pH of 6 with sodium hydroxide solution is added, with stirring, over the course of 30 minutes. The resultant fibre suspension is further stirred for 1 hour and then treated with 6.6 ml of a 10% aqueous aluminium chloride solution. The pH of the suspension is subsequently adjusted to 9.5 with aqueous ammonia.

C. A suspension of 46.5 g of diatomaceous earth in 2000 ml of water is treated, with stirring, with 115.4 ml of a 13% aqueous colloidal solution of a polyamidepolyamine as described in Instruction A. The suspension is further stirred for 5 hours at a temperature of 23° C. Then 500 ml of a 1% aqueous solution of polymethacrylic acid (average molecular weight 80,000 –100,000) is stirred in over the course of 3 minutes. With constant stirring, the suspension is treated with 97 ml of a 10% aqueous aluminium chloride solution. The pH of the suspension is subsequently adjusted to 9.5 with a 10% sodium hydroxide solution. The treated carrier material is then squeezed out to a weight of 212.1 g on a vacuum suction filter. The solids content of the adsorption material is 67.87 g.

D. By substituting the same amount of kieselguhr for the 46.5 g of diatomaceous earth in Instruction C and carrying out the pretreatment described therein, the final pH of the suspension being adjusted to 6.0 with a 10% sodium hydroxide solution, there are obtained 172.7 g of moist adsorption material. Solids content: 66.2 g.

E. By substituting the same amount of asbestos for the 46.5 g of kieselguhr in Instruction D and carrying out the pretreatment described therein, there are obtained 337.2 g of moist adsorption material. Solids content: 65.2 g.

F. By substituting a mixture of 23.25 g of asbestos and 23.25 g of bleached sulphite cellulose for the 46.5 g of kieselguhr in Instruction D and carrying out the pretreatment described therein, there are obtained 304.2 g of moist adsorption material. Solids content: 67.9 g.

G. By substituting 46.5 g of an insoluble condensation polymer of urea and formaldehyde (specific surface area greater than 22 m²/g) for the kieselguhr in Instruction D, there are obtained 323.4 g of moist adsorption agent. Solids content: 66.8 g.

H. By substituting 1500 ml of a 1% aqueous solution of carboxymethyl cellulose (DS ca. 0.8) for the 500 ml of polymethacrylic acid solution in Instruction C and adjusting the final pH of the suspension to 6.0, there are obtained 264 g of moist adsorption material. Solids content: 70.4 g.

I. A suspension of 46.5 g of asbestos in 2000 ml of water is treated, with stirring, with 15 g of polyethyleneimine (average molecular weight 30,000 to 40,000). The suspension is stirred for 5 hours at 23° C. Then 500 ml of a 1% aqueous solution of polymethacrylic acid (average molecular weight 80,000 to 100,000) is stirred in over the course of 3 minutes. The suspension is treated, with stirring, with 97 ml of a 10% aqueous aluminium chloride solution and then the pH of the suspension is adjusted to 6.0 with a 10% sodium hydroxide solution. The pretreated material is then filtered off to a weight of 391 g. Solids content of this moist adsorbent: 59.9 g.

J. A suspension of 46.5 g of asbestos in 2000 ml of water is treated, with stirring, with 115.4 ml of a 13% colloidal solution of a polyamidepolyamine as described in Instruction A. The suspension is stirred for 5 hours at a temperature of 23° C. Then 500 ml of a 1% aqueous solution of polymethacrylic acid (average molecular weight 80,000 to 100,000) is stirred in over the course of 3 minutes. The pH of the suspension is then adjusted to 9.5 with 10% sodium hydroxide solution and the treated material is filtered off to a weight of 139 g. Solids content: 59.3 g.

K. By substituting the same amount of diatomaceous earth for the 46.5 g of asbestos in Instruction J and carrying out the pretreatment as described therein, there are obtained 137.5 g of moist adsorption material. Solids content: 51.2 g.

EXAMPLE 1

50 g of filter material manufactured according to Instruction A are poured onto a glass frit (diameter: 6 cm, height: 30 cm), allowed to drop off, gently pressed and covered with 70 ml of glass beads (diameter 2 mm). A dark red residual liquor (10 litres) which is adjusted to pH 4 and which contains 0.1 g/l of the dye of the formula

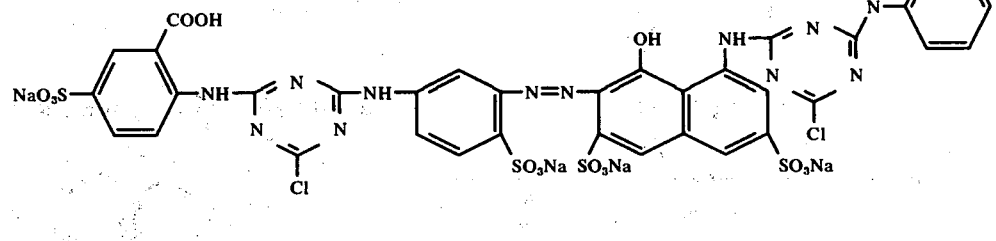

in dissolved form is passed over this filter at a temperature of 90°–95° C. The resultant filtrate is completely colourless. If the decolorisation experiment is carried out with 50 g of untreated fuller's earth, only 0.2 liter of the above residual liquor can be decolorised.

EXAMPLE 2

10 g of filter material manufactured according to Instruction B are processed to a filter as described in Example 1. A dark red residual liquor (0.8 liter) with a pH of 4 and containing in dissolved form 0.1 g/l of the dye described in Example 1 is passed over this filter at a temperature of 90°–95° C. The filtrate obtained under these conditions has a degree of decolorisation of over 90%. No decolorisation of the residual liquor can be observed by carrying out the same decolorisation with 10 g of polyester fibres which have not been pretreated.

EXAMPLE 3

A dark red residual liquor (5 liters) which contains in dissolved form 0.1 g/l of a red dye of the formula

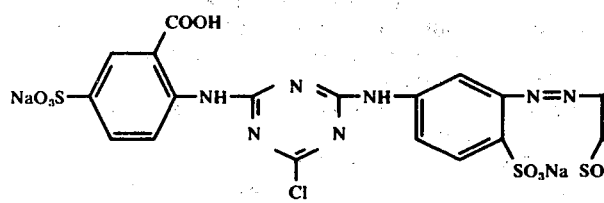

is put into a vessel. The adsorption materials listed in column 2 of Table 1 are added to this well stirred residual liquor which is adjusted to the respective pH indicated in column 3 of the table. The decolorisation of the residual liquor is then effected at the temperatures indicated in column 4. During each experiment, a sample is taken from the vessel after a contact time of 15 minutes. Each sample is filtered over a folded filter and the residual dye concentration in the filtrate indicated in column 5 is ascertained.

Table 1

| 1 | 2 | | 3 | 4 | 5 |
|---|---|---|---|---|---|
| | adsorption material | | | | Residual dye concentration after 15 mins. contact time |
| No. | Instruction | g (moist) | pH | °C | in mg/l |
| 1 | C | 5,15 | 3,5 | 80 | 1 |
| 2 | C | 7,7 | 3,5 | 30 | 25 |
| 3 | D | 4,3 | 3,5 | 80 | 0,5 |
| 4 | D | 6,45 | 3,5 | 30 | 2 |
| 5 | E | 8,53 | 3,5 | 80 | 0 |
| 6 | E | 12,8 | 3,5 | 30 | 0,5 |
| 7 | E | 8,53 | 5,5 | 80 | 30 |
| 8 | E | 12,8 | 5,5 | 30 | 55 |
| 9 | E | 12,8 | 7,0 | 30 | 30 |
| 10 | F | 7,4 | 3,5 | 80 | 0,5 |
| 11 | F | 11,0 | 3,5 | 30 | 2 |
| 12 | G | 7,98 | 3,5 | 80 | 0 |
| 13 | G | 11,97 | 3,5 | 30 | 0 |
| 14 | H | 6,18 | 3,5 | 80 | 0 |
| 15 | H | 9,28 | 3,5 | 30 | 0 |
| 16 | I | 10,76 | 3,5 | 80 | 0 |
| 17 | I | 16,1 | 3,5 | 30 | 0 |
| 18 | J | 3,87 | 3,5 | 80 | 30 |
| 19 | J | 5,8 | 3,5 | 30 | 40 |
| 20 | K | 4,44 | 3,5 | 80 | 30 |
| 21 | K | 6,63 | 3,5 | 30 | 40 |

EXAMPLE 4

A dark red residual liquor (5 litres) which contains in dissolved form 0.1 g/l of the dye described in Example 3 together with 50 mg/l of a dyeing assistant of the formula

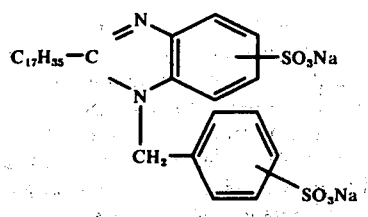

and 16 g/l of sodium chloride is put into a vessel. The decolorisation experiments are carried out in a manner analogous to that described in Example 3. The conditions and results are reported in Table 2.

Table 2

| 1 | 2 | | 3 | 4 | 5 |
|---|---|---|---|---|---|
| | adsorption material | | | | Residual dye concentration after 15 mins. contact time |
| No. | Instruction | g (moist) | pH | °C | in mg/l |
| 1 | C | 5,15 | 3,5 | 80 | 0,5 |
| 2 | C | 7,7 | 3,5 | 30 | 5 |
| 3 | E | 8,53 | 3,5 | 80 | 2 |
| 4 | E | 12,8 | 3,5 | 30 | 0 |
| 5 | F | 7,4 | 3,5 | 80 | 18 |
| 6 | F | 11,0 | 3,5 | 30 | 15 |

EXAMPLE 5

A dark blue residual liquor (5 liters) which contains 0.1 g/l of a blue dye of the formula

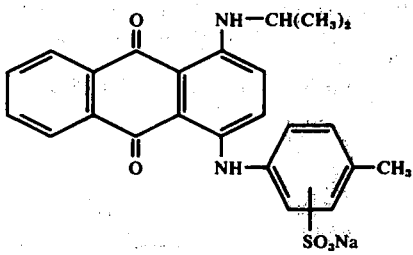

and 0.5 g/l of a dyeing assistant of the composition

37 %

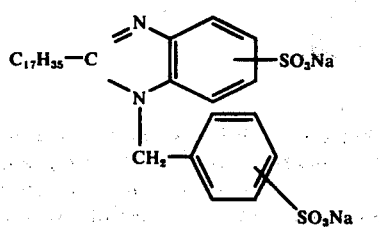

9,3 %

2,9 % $C_{16}H_{33}O(CH_2CH_2O)_6H$
9,0 %

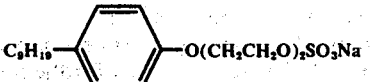

41,8 % water are put into a vessel. The decolorisation experiments are carried out in a manner analogous to that described in Example 3. The conditions and results of these decolorisation experiments are reported in Table 3

Table 3

| No. | adsorption material Instruction | g (moist) | pH | °C | Residual dye concentration after 15 mins. contact time in mg/l |
|---|---|---|---|---|---|
| 1 | C | 5,15 | 3,5 | 80 | 8 |
| 2 | C | 7,7 | 3,5 | 30 | 4 |
| 3 | E | 8,5 | 3,5 | 80 | 15 |
| 4 | E | 12,8 | 3,5 | 30 | 0 |
| 5 | F | 7,4 | 3,5 | 80 | 30 |
| 6 | F | 11,0 | 3,5 | 30 | 4 |

We cliam:

1. An adsorption agent for removing a contaminant from an industrial waste water effluent, which comprises a non-cellulosic carrier pretreated with a basic nitrogeneous polymer and a polyanionic polymer, wherein said basic nitrogeneous polymer is a polyamidepolyamine of a polymeric fatty acid and a polyamine.

2. An adsorption agent according to claim 1 wherein said polymeric fatty acid is an aliphatic ethylenically unsaturated dimeric to trimeric fatty acid.

3. An adsorption agent according to claim 2 wherein said polymeric fatty acid is a dimerized to trimerized linoleic or linolenic acid.

4. The adsorption agent of claim 1, wherein the carrier is a non-ionogenic synthetic plastic, an inorganic filler or a mixture of such carriers.

5. The adsorption agent of claim 1, which comprises in addition a cellulosic material in an amount of at most 50 percent by weight, based on the entire weight of the carrier material.

6. The adsorption agent of claim 1, wherein the polyamide-polyamine has an amino value of 200 to 650 mg of potassium hydroxide per gram of polyamidepolyamine.

7. The adsorption agent of claim 1, wherein the polyanionic polymer is a homopolymer or copolymer of an aliphatic $\alpha:\beta$-ethylenically unsaturated carboxylic acid which is unsubstituted or substituted by halogen or alkyl having 1 to 4 carbon atoms.

8. The adsorption agent of claim 1 which additionally comprises a salt of a polyvalent metal.

9. The adsorption agent of claim 1 which additionally comprises a hydrated oxide of a polyvalent metal.

* * * * *